(12) United States Patent
Jain et al.

(10) Patent No.: US 9,014,202 B2
(45) Date of Patent: Apr. 21, 2015

(54) LEAST DISRUPTIVE AF ASSIGNMENTS IN TRILL LAN ADJACENCIES

(71) Applicant: Cisco Technology, Inc., San Jose, CA (US)

(72) Inventors: Sourabh Jain, Sunnyvale, CA (US); Varun Shah, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 13/767,451

(22) Filed: Feb. 14, 2013

(65) Prior Publication Data

US 2014/0226480 A1    Aug. 14, 2014

(51) Int. Cl.
    *H04W 4/00*       (2009.01)
    *H04L 12/28*      (2006.01)
    *H04L 12/803*     (2013.01)

(52) U.S. Cl.
    CPC .................................... *H04L 47/125* (2013.01)

(58) Field of Classification Search
    USPC ................. 370/254–255, 338, 401, 408–409; 709/226, 229
    See application file for complete search history.

(56) References Cited

U.S. PATENT DOCUMENTS

| | | | |
|---|---|---|---|
| 2012/0278599 A1* | 11/2012 | Nilakantan et al. | 713/2 |
| 2013/0003739 A1* | 1/2013 | Raman et al. | 370/392 |
| 2013/0223454 A1* | 8/2013 | Dunbar et al. | 370/400 |

OTHER PUBLICATIONS

U.S. Appl. No. 13/767,438, filed Feb. 14, 2013 entitled "Mechanism and Framework for Finding Optimal Multicast Tree Roots Without the Knowledge of Traffic Sources and Receivers for Fabricpath and TRILL", Inventors: Jain et al.

* cited by examiner

*Primary Examiner* — Redentor Pasia
(74) *Attorney, Agent, or Firm* — Merchant & Gould

(57) ABSTRACT

A methodology is described for achieving efficient forwarder appointments. Such efficient appointment may provide an equal load on each participating routing bridge in the TRILL LAN. Load may be viewed as the number of VLANs for which a given node is an appointed forwarder. Furthermore, efficient appointment may be executed with a minimum of traffic disruption. Minimal disruption may be ensured by forwarder appointments by moving a minimum number of VLANs to ensure an equal load on each participating routing bridge.

14 Claims, 5 Drawing Sheets

300

A change in the number of VLANs in an enabled VLAN set identified
310

Number of nodes on the TRILL LAN after the change in the number of VLANs identified
320

Adjusting appointed forwarder status of the nodes to provide equal distribution of VLANs between the nodes based on the changed number of VLANs
330

FIG. 3

LEAST DISRUPTIVE AF ASSIGNMENTS IN TRILL LAN ADJACENCIES

BACKGROUND

Layer-2 link-state protocols such as Fabricpath and TRansparent Interconnection of Lots of Links (TRILL) networks—are currently being deployed as the networking fabric to enable large scale data centers. TRILL is an IETF (Internet Engineering Task Force) protocol implemented by devices such as Routing Bridges. TRILL introduces new data and control planes for Ethernet networks. FabricPath protocol allows combining the plug-and-play simplicity of Ethernet with the reliability and scalability of Layer 3 routing. FabricPath allows for the creation of highly scalable Layer 2 multipath networks without the Spanning Tree Protocol. Such networks are used, for example, with large virtualization deployments, private clouds, and high-performance computing (HPC) environments.

TRILL proposes to use a "link-state" style routing framework by building layer-3 style "adjacencies" with physical neighbors, by sending HELLO packets. However, there is a key difference in how adjacencies are formed in TRILL and FabricPath. In FabricPath, only "point-to-point" neighbor links are allowed. However, TRILL allows LAN-based adjacencies in addition to "point-to-point". In order to deploy LAN-based adjacencies, it should be ensured that there is only one appointed forwarder for each VLAN. The appointed forwarder for each VLAN may be responsible for the encapsulation and decapsulation of the packets belonging to each respective VLAN.

The appointed forwarder appointment process may be a centralized process for each LAN. In TRILL, the process may be performed by a designated routing bridge on a given LAN. There is no prescribed algorithm for these appointments, and prior art approaches may be somewhat naïve. One such prior art approach assigns each node on a VLAN based on simple load-sharing logic. For example, if there are V VLANs on a LAN and there are N routing-bridges on the same LAN, then each routing bridge may be appointed as an appointed forwarder for V/N VLANs.

The problem with such prior art approaches is that these fail to consider the existing appointed forwarder appointments. This may result in traffic disruption for a large number of VLANs due to the change of the appointed forwarder.

BRIEF DESCRIPTION OF THE DRAWINGS

The accompanying drawings, which are incorporated in and constitute a part of this disclosure, illustrate various embodiments. In the drawings:

FIG. 3 is a flow chart illustrating embodiments of this disclosure;

DETAILED DESCRIPTION OF EXAMPLE EMBODIMENTS

Overview

Figure 1:
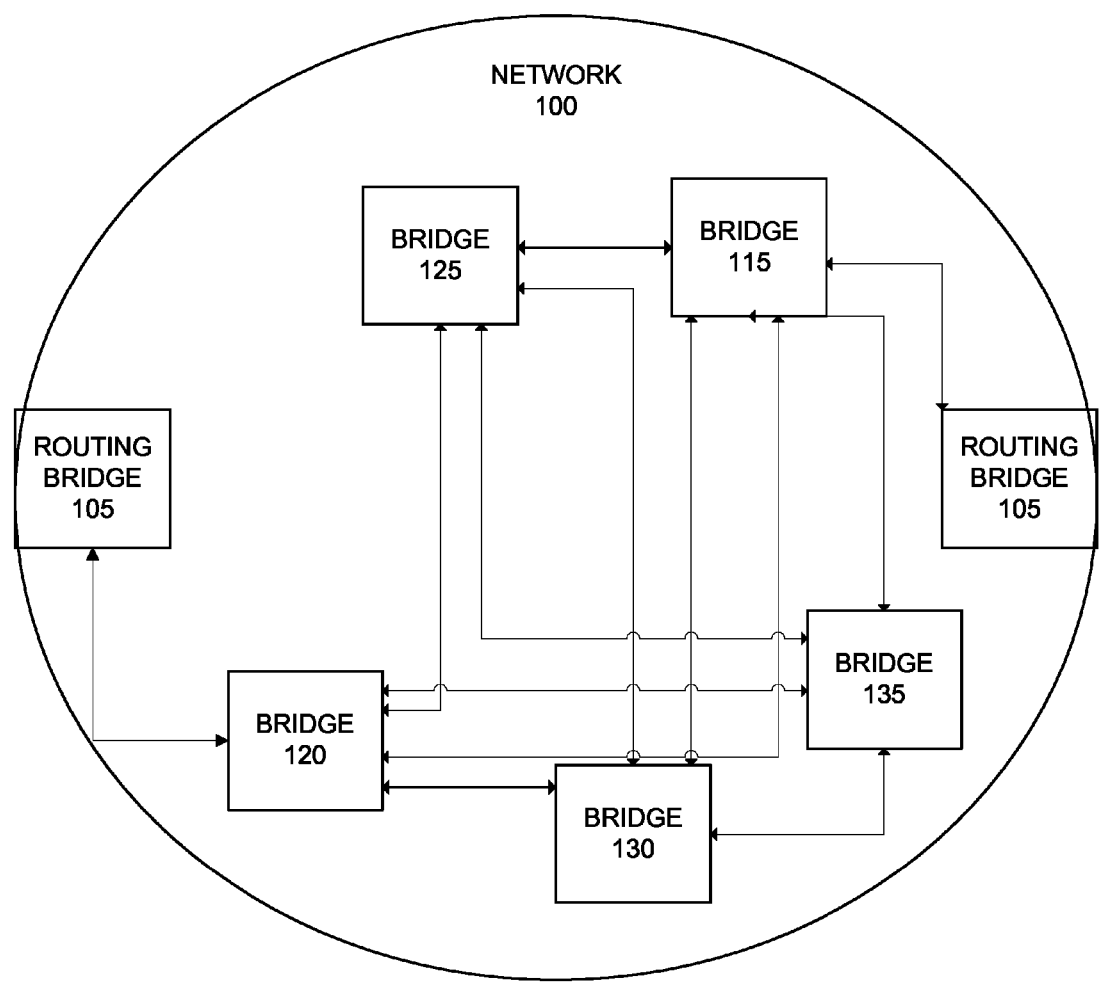
FIG. 1 illustrates an example network environment for embodiments of this disclosure.

Consistent with embodiments of the present disclosure, systems and methods are disclosed for assigning appointed forwarders in a TRILL LAN.

In some embodiments, a method of assigning appointed forwarders in a TRILL LAN is described. The method may comprise first identifying a trigger event. Next, the number of nodes on the TRILL LAN after the trigger event may be determined. A number of VLANs enabled by a network device may then be determined. The appointed forwarder status of the nodes may then be adjusting to provide equal distribution of VLANs between the nodes.

In some embodiments, a method of assigning appointed forwarders in a TRILL LAN is described. A change in the number of VLANs in an enabled VLAN set may be identified. Next, a number of nodes on the TRILL LAN may be determined. Appointed forwarder status of the nodes may next be adjusted to provide equal distribution of VLANs between the nodes based on the changed number of VLANs.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

EXAMPLE EMBODIMENTS

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and substituting, reordering, or adding stages to the disclosed methods may modify the methods described herein. Accordingly, the following detailed description does not limit the disclosure. Instead, the proper scope of the disclosure is defined by the appended claims.

Embodiments of the present disclosure describe a methodology for achieving efficient appointed forwarder appointments. Such efficient appointment may provide an equal load on each participating routing bridge in the TRILL LAN. Load may be viewed as the number of VLANs for which a given node is an appointed forwarder. Furthermore, efficient appointment may be executed with a minimum of traffic disruption. Embodiments of the present disclosure aid in ensuring that minimal disruption is caused by appointed forwarder appointments by moving a minimum number of VLANs to achieve an equal load on each participating routing bridge.

Referring to FIG. 1, an example of a network 100 in which embodiments described herein may be implemented is shown. The embodiments described herein may operate in the context of a data communication network including multiple network devices. Some of the devices in the network may be routing bridges, switches, bridges, routers, gateways, or other network devices. In some embodiments, the network device is implemented on a general purpose machine as described below with respect to FIG. 5.

In some embodiments, network 100 may be a TRILL network with one or more of the network devices being routing bridges. The network 100 shown in FIG. 1 includes routing bridge 105 and routing bridge 110 located at an edge of network 100. Network 100 may further include a plurality of internal routing bridges 115, 120, 125, 130, 135. Routing bridge 105 and routing bridge 100 (also referred to as "edge routers") may operate as ingress and egress nodes, respectively, for a flow entering network 100 at routing bridge 105 and leaving the network respectively at routing bridge 110, for example.

There are a number of triggers, which may be found on a TRILL adjacency. These triggers may trigger appointed forwarder appointments to provide an equal load on each participating router bridge on the TRILL LAN.

In some embodiments, one such trigger occurs when a new node joins the TRILL LAN. A total of V VLANs may be enabled at a given designated routing bridge. If the LAN has a total on N nodes (excluding the new node), then each node should be an appointed forwarder for no more than ceil(V/N) VLANs [the ceil function maps the number to the next largest integer]. However, after the new node is added, each node should not be an appointed forwarder for more than ceil(V/(N+1)) VLANs.

To prevent more than minimal disruption, the extra VLANs from each node, i.e. ceil(V/N)–ceil(V/(N+1), may be assigned to the new node making the new node the appointed forwarder for these "extra" VLANs. In some embodiments, the extra VLANs may be transferred as a contiguous chunk. Upon completion of this process, each node on the LAN will have no more than ceil(V/(N+1)) VLANs. Similarly, traffic disruption does not happen for more than ceil(V/(N+1)) VLANs, which are the VLANs that were assigned to the new node joining the adjacencies.

In some embodiments, each node may have a different set of "enabled VLANs". In such a case, VLANs are only moved to a new node if the VLANs are enabled on the new node.

The transfer of VLANs through contiguous chunks allows systems to compact the relevant information. The information when compacted or truncated may be placed in hello packets for distribution. For example, a first node may have assigned VLANs 1-50. Similarly, a second node may have assigned VLANs 51-100.

At a point in time, a third node may join the LAN. Then, each of the three nodes should not be an appointed forwarder for more than ceil(100/3) or 34 VLANs. Extra nodes may be taken from each of the first and second nodes to be assigned to the third node. Specifically, ceil(100/2)–ceil (100/3) or 50–34 which equals 16 extra VLANs to be transferred from the first In some embodiments, a trigger may occur when a node leaves the TRILL LAN. For example, the number of VLANs may be represented again by V and the number of nodes on the LAN before the departure of a node may be represented by N. The VLANs for which the departed node is the appointed forwarder must be altered at this point. This minimal level of disruption will not be for more that ceil(V/N) number of VLANs.

The VLANs that require redistribution to still-existing nodes may be divided into N–1 chunks. These chunks may be assigned to the N–1 remaining nodes.

A third trigger may occur when additional VLANs are added to the enabled VLAN set. The number of prior-existing VLANs may be represented by V'. The number of VLANs after the trigger will be represented by V. Again, the number of nodes on the LAN may be represented by N. In this scenario, there are V'-V VLANs for which appointed forwarder appointment is needed. In some embodiments, these V'-V VLANs may be divided into N contiguous chunks. These contiguous chunks may be distributed to the corresponding nodes.

A fourth trigger may occur when a VLAN is removed from the enabled VLAN set. For example, the number of prior-existing VLANs may be represented by V'. The number of VLANs after the trigger will be represented by V. Again, the number of nodes on the LAN may be represented by N. Here, the appointed forwarder list should be updated to reflect removed VLANs. Subsequently, each node should not be an appointed forwarder for more than ceil(V/N) VLANs.

To achieve this distribution, the extra VLANs may be removed from each node which has more than ceil(V/N) VLANs. The removed VLANs may then be assigned to nodes that have less than ceil(V/N) VLANs. Such assignment may ensure that each node has an equal number VLANs while only moving a minimal number of VLANs.

Figure 2:
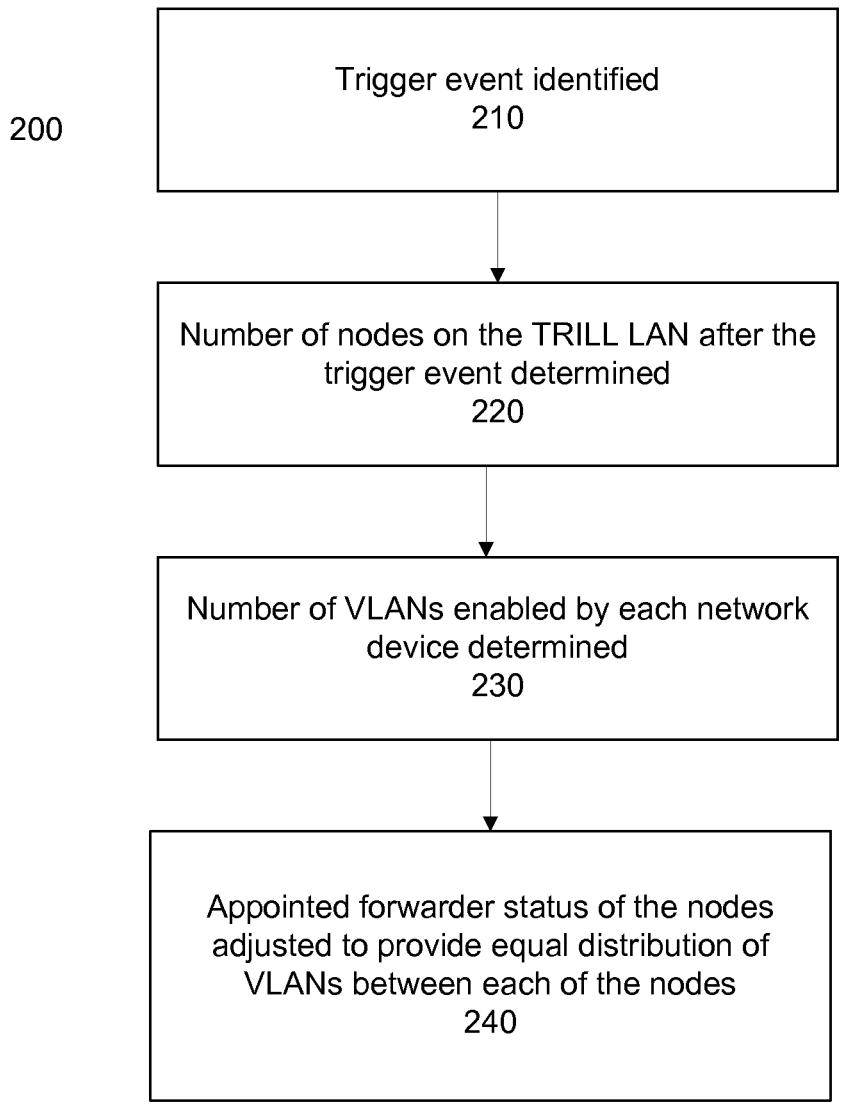
FIG. 2 is a flow chart illustrating embodiments of this disclosure.

FIG. 2 is a flow chart illustrating operation of embodiments of the present disclosure to assign appointed forwarders in a TRILL LAN. Method 200 may start at step 210 where a trigger event may be identified. The trigger event may be any trigger event as discussed above. In some embodiments the trigger event may be the addition of a new node to the TRILL LAN. Similarly, the trigger event may be the removal of a node from the TRILL LAN.

Method 200 may then proceed to step 220. At step 220, the number of nodes on the TRILL LAN after the trigger event may be determined. A previous value may be adjusted to represent the real-time count of nodes. Likewise, at step 230 the number of VLANs enabled by a network device may also be determined. In some embodiments, the network device may be a designated routing bridge.

Method 200 may then proceed to step 240. At step 240, the appointed forwarder status of the nodes may be adjusted to provide equal distribution of VLANs between each of the nodes. In some embodiments where the trigger event involves the addition of a new node, the step of adjusting may comprise assigning ceil(the determined number of VLANs/a determined number of nodes prior to the trigger event) number of VLANs from each node to the new node. The VLANs may be taken from nodes in contiguous chunks to be provided to the new node. Furthermore, in some embodiments, it may be ensured that VLANs are only assigned to nodes that contain the VLAN within an enabled VLAN set associated with the node.

In embodiments where the trigger event involves the removal of a node, the step of adjusting may include dividing the VLANs previously associated with the removed node into a number of chunks equal to the determined number of nodes, and assigning each chunk to a respective node.

FIG. 3 is a flow chart illustrating operating of embodiments of the present disclosure of assigning appointed forwarders in a TRILL LAN. Method 300 may begin at step 310 where a change in the number of VLANs in an enabled VLAN set may be identified. Method 300 may then proceed to step 320. At step 320, the number of nodes on the TRILL LAN after the change in the number of VLANs is identified.

Method 300 may then proceed to step 330. At step 330, adjusting appointed forwarder status of the nodes to provide equal distribution of VLANs between the nodes based on the changed number of VLANs. In embodiments where the changed number of VLANs is greater than a previously existing number of VLANs, the step of adjusting may include dividing the additional VLANs into a number of chunks equal to the number of nodes and assigning each chunk to a corresponding node. In some embodiments, the chunks are contiguous chunks.

In embodiments where the changed number of VLANs is less than a previously existing number of VLANs, a list of appointed forwarders may be updated to reflect the removed VLANs.

Figure 4:
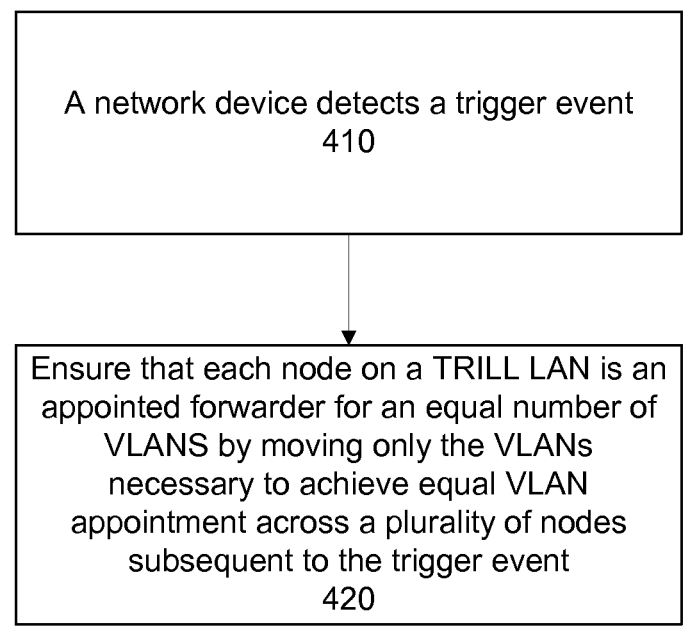
FIG. 4 is a flow chart illustrating embodiments of this disclosure.

FIG. 4 is a flow chart illustrating operating of embodiments of the present disclosure of assigning appointed forwarders in a TRILL LAN. Method 400 may begin at step 410 where a network device may detect a trigger event as discussed above. One such network device may be a designated routing bridge. The network device may detect the trigger event on the TRILL LAN, where the trigger event alters the number of nodes in the TRILL LAN. In some embodiments, the trigger event may alter the number of VLANs in an enabled VLAN set associated with the TRILL LAN.

Next, at step 420 it may be ensured that each node on a TRILL LAN is an appointed forwarder for an equal number of VLANS by moving only the VLANs necessary to achieve equal VLAN appointment across a plurality of nodes subsequent to the trigger event. In some embodiments, the network device may assign contiguous chunks of unassigned VLANs to corresponding nodes. In some embodiments, the number of VLANs that each respective node is an appointed forwarder for may be limited to a number no more than ceil(the determined number of VLANs/the determined number of nodes)

Figure 5:
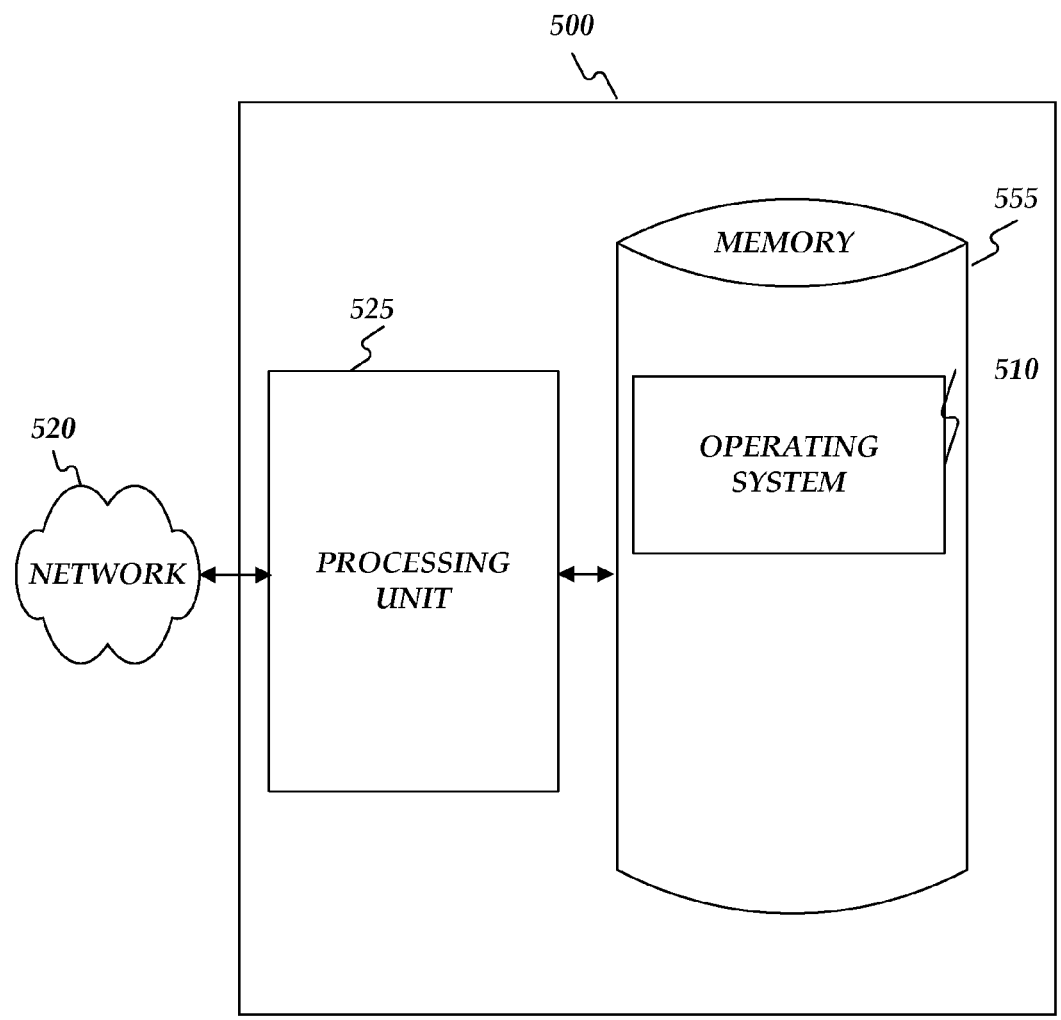
FIG. 5 is a block diagram of a computing network device.

FIG. 5 illustrates a computing device 500, such as a server, host, or other network devices described in the present specification. Computing device 500 may include processing unit 525 and memory 555. Memory 555 may include software configured to execute application modules such as an operating system 510. Computing device 500 may execute, for example, one or more stages included in the methods as described above. Moreover, any one or more of the stages included in the above describe methods may be performed on any element shown in FIG. 5.

Computing device 500 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method of assigning appointed forwarders by a network device in a TRILL LAN comprising:
    identifying a trigger event, wherein the trigger event is the addition of a new node to the TRILL LAN;
    determining a number of nodes on the TRILL LAN after the trigger event;
    determining a number of VLANs enabled by a designated routing bridge;
    adjusting appointed forwarder status of the nodes to provide equal distribution of VLANs between the nodes; and
    assigning a threshold number of VLANs from each node to the new node, the threshold being equal to the determined number of VLANs enabled by the designated routing bridge divided by a determined number of nodes prior to the trigger event.

2. The method of claim 1, wherein the trigger event further comprises the removal of a node from the TRILL LAN.

3. The method of claim 2, further comprising dividing the VLANs from a removed node into a number of chunks equal to the determined number of nodes, and assigning each chunk to a respective node.

4. The method of claim 1, further comprising limiting the number of VLANs that each respective node is an appointed forwarder for to a number no more than ceil(the determined number of VLANs/the determined number of nodes).

5. The method of claim 1, further comprising distributing VLANs in contiguous chunks.

6. The method of claim 1, further comprising assigning VLANs only to nodes that contain the VLAN to be assigned within an enabled VLAN set associated with the node.

7. A method of assigning appointed forwarders by a network device in a TRILL comprising:
    identifying a change in the number of VLANs in an enabled VLAN set;
    determining a number of nodes on the TRILL LAN;
    adjusting appointed forwarder status of the nodes to provide equal distribution of VLANs between the nodes based on the change in the number of VLANs; and
    limiting the number of VLANs that each respective node of the number of nodes is an appointed forwarder for to a number no more than ceil(the number of VLANs/the determined number of nodes).

8. The method of claim 7 further comprising:
    wherein the change in the number of VLANs is greater than a previously existing number of VLANs, dividing the additional VLANs into a number of chunks equal to the number of nodes; and
    assigning each chunk to a corresponding node.

9. The method of claim 8, wherein the chunks are contiguous chunks.

10. The method of claim 7, wherein the changed number of VLANs is less than a previously existing number of VLANs, updating a list of appointed forwarders to reflect the removed VLANs.

11. The method of claim 10, further comprising:
dividing the additional VLANs into a number of chunks equal to the number of nodes; and
assigning each chunk to a corresponding node.

12. A network device comprising:
a memory containing executable instructions for causing a processor to perform operations comprising:
detecting a trigger event;
appointing each node on a TRILL LAN an appointed forwarder for an equal number of VLANS by moving only the VLANs necessary to achieve equal VLAN appointment across a plurality of nodes subsequent to the trigger event;
causing a processor to perform operations to assign contiguous chunks of VLANs to corresponding nodes;
detecting the trigger event on the TRILL LAN, wherein the trigger event that alters the number of nodes in the TRILL LAN; and
limiting the number of VLANs that each respective node is an appointed forwarder for to a number no more than ceil(the determined number of VLANs/the determined number of nodes).

13. The network device of claim 12, wherein the network device is a designated routing bridge.

14. The network device of claim 12, the memory further comprising executable instructions for causing a processor to: detect the trigger event on the TRILL LAN, wherein the trigger event that alters the number of VLANs in an enabled VLAN set associated with the TRILL LAN.

\* \* \* \* \*